(12) United States Patent
Lee et al.

(10) Patent No.: US 8,632,369 B2
(45) Date of Patent: Jan. 21, 2014

(54) TERMINAL CONNECTING DEVICE FOR ENERGY STORAGE MODULE

(75) Inventors: Jae-Kyung Lee, Seoul (KR);
Yoon-Hyeok Kwon, Seoul (KR);
Tae-Ho Suh, Gyeonggi-do (KR)

(73) Assignee: LS Mtron Ltd., Anyang (KR)

( * ) Notice: Subject to any disclaimer, the term of this patent is extended or adjusted under 35 U.S.C. 154(b) by 23 days.

(21) Appl. No.: 13/408,117

(22) Filed: Feb. 29, 2012

(65) Prior Publication Data

US 2013/0149919 A1  Jun. 13, 2013

(30) Foreign Application Priority Data

Dec. 7, 2011   (KR) .................. 10-2011-0130421

(51) Int. Cl.
*H01R 4/38* (2006.01)

(52) U.S. Cl.
USPC ........................................... 439/766

(58) Field of Classification Search
USPC ......... 439/627, 754, 762, 763, 764, 765, 766, 439/500; 429/158, 160, 161, 121
See application file for complete search history.

(56) References Cited

U.S. PATENT DOCUMENTS

| | | | | |
|---|---|---|---|---|
| 1,073,670 A * | 9/1913 | Ford | ............................... | 439/504 |
| 1,201,215 A * | 10/1916 | Milliken | ....................... | 429/121 |
| 1,215,004 A * | 2/1917 | Decker | .......................... | 429/158 |
| 1,373,241 A * | 3/1921 | Heberling et al. | ............ | 429/121 |
| 1,982,801 A * | 12/1934 | Gerking | ........................... | 429/99 |
| D94,298 S * | 1/1935 | Frank | ........................... | D13/155 |
| 3,436,719 A * | 4/1969 | Scheinbaum | ................. | 439/510 |
| 3,471,110 A * | 10/1969 | Mack | ............................ | 248/74.4 |
| 3,739,322 A * | 6/1973 | Haegert | ......................... | 439/764 |
| 3,769,095 A * | 10/1973 | Schmidt | ......................... | 429/151 |
| 3,909,301 A * | 9/1975 | Schenk, Jr. | ..................... | 429/208 |
| D263,788 S * | 4/1982 | McKinnon et al. | ............. | D8/394 |
| 4,345,806 A * | 8/1982 | McHenney | ................... | 439/510 |
| 4,581,306 A * | 4/1986 | Hasenauer et al. | ............ | 429/123 |
| D285,647 S * | 9/1986 | Sachs | ............................. | D8/356 |
| 5,154,646 A * | 10/1992 | Shoup | ........................... | 439/772 |
| 5,713,707 A * | 2/1998 | Gagnon | ......................... | 411/175 |
| D399,486 S * | 10/1998 | Deans | .......................... | D13/120 |
| 5,985,480 A * | 11/1999 | Sato et al. | ........................ | 429/65 |
| 6,186,831 B1 * | 2/2001 | Tsai | ............................... | 439/627 |

(Continued)

FOREIGN PATENT DOCUMENTS

| | | |
|---|---|---|
| JP | 2006-107808 | 4/2006 |
| JP | 2010-239027 | 10/2010 |
| KR | 10-2010-0119122 | 11/2010 |
| WO | 2008098193 | 8/2008 |

*Primary Examiner* — Ross Gushi
(74) *Attorney, Agent, or Firm* — Stroock & Stroock & Lavan LLP

(57) ABSTRACT

Disclosed is a terminal connecting device for an energy storage module including a busbar having a body portion formed of a plate having a predetermined length stepped at both ends, and a cell terminal mounting portion having an insert hole at each end of the body portion, and a fastening member formed of a plate to secure the busbar by a screw connection with a cell terminal through the insert hole of the busbar, the fastening member having a nut body portion with a hollow at the center and the outer periphery processed in the shape of a nut, and a nut screw portion having a screw thread formed along the inner periphery of the hollow of the nut body portion, wherein the height of the step of the body portion of the busbar corresponds to the thickness of the nut body portion of the fastening member.

19 Claims, 16 Drawing Sheets

(56) References Cited

U.S. PATENT DOCUMENTS

| | | | |
|---|---|---|---|
| 6,328,604 B1 * | 12/2001 | Inoue et al. | 439/627 |
| 6,479,187 B1 * | 11/2002 | Takasaki et al. | 429/157 |
| 6,794,081 B2 * | 9/2004 | Heimer | 429/121 |
| 6,902,434 B2 * | 6/2005 | Stack | 439/620.28 |
| 7,077,704 B2 * | 7/2006 | Ikeda et al. | 439/627 |
| D545,304 S * | 6/2007 | Sergi | D14/238 |
| 7,229,327 B2 * | 6/2007 | Zhao et al. | 439/840 |
| 7,270,576 B2 * | 9/2007 | Kim et al. | 439/627 |
| 7,294,020 B2 * | 11/2007 | Zhao et al. | 439/627 |
| 7,381,101 B2 * | 6/2008 | Roset et al. | 439/754 |
| 7,393,608 B2 * | 7/2008 | Cho | 429/123 |
| 7,458,862 B2 * | 12/2008 | Zhao et al. | 439/840 |
| 7,507,124 B2 * | 3/2009 | Kim | 439/627 |
| 7,556,533 B2 * | 7/2009 | Seo | 439/627 |
| 7,601,457 B2 * | 10/2009 | Byun et al. | 429/121 |
| 7,614,906 B2 * | 11/2009 | Kim et al. | 439/500 |
| 7,736,796 B2 * | 6/2010 | Nagatani et al. | 429/158 |
| 7,776,467 B2 * | 8/2010 | Kato et al. | 429/160 |
| 7,867,643 B2 * | 1/2011 | Cho | 429/61 |
| 7,887,943 B2 * | 2/2011 | Yoshikane et al. | 429/123 |
| 7,935,438 B2 * | 5/2011 | Kim | 429/160 |
| 7,972,185 B2 * | 7/2011 | Kim | 439/754 |
| 7,998,611 B2 * | 8/2011 | Yoshihara et al. | 429/148 |
| 8,033,875 B1 * | 10/2011 | Maguire | 439/762 |
| 8,038,487 B2 * | 10/2011 | Tsuchiya et al. | 439/765 |
| 8,114,540 B2 * | 2/2012 | Trester et al. | 429/160 |
| 8,178,234 B2 * | 5/2012 | Fukuoka et al. | 429/160 |
| 8,206,847 B2 * | 6/2012 | Miyazaki | 429/158 |
| 8,287,313 B2 * | 10/2012 | Kwon et al. | 439/627 |
| 8,329,338 B2 * | 12/2012 | Tasai et al. | 429/211 |
| 8,338,021 B2 * | 12/2012 | Cheon et al. | 429/158 |
| 8,372,534 B2 * | 2/2013 | Carignan et al. | 429/158 |
| 2004/0043663 A1 * | 3/2004 | Ikeda et al. | 439/627 |
| 2005/0079408 A1 * | 4/2005 | Hirano | 429/82 |
| 2005/0250006 A1 * | 11/2005 | Kim | 429/160 |
| 2005/0250386 A1 * | 11/2005 | Kim | 439/627 |
| 2006/0068648 A1 * | 3/2006 | Kim et al. | 439/766 |
| 2006/0091855 A1 * | 5/2006 | Seo | 320/116 |
| 2006/0094289 A1 * | 5/2006 | Kim et al. | 439/500 |
| 2006/0105624 A1 * | 5/2006 | Yoshikane et al. | 439/500 |
| 2007/0026739 A1 * | 2/2007 | Kim et al. | 439/627 |
| 2007/0099073 A1 * | 5/2007 | White et al. | 429/158 |
| 2009/0104516 A1 | 4/2009 | Yoshihara et al. | |
| 2009/0123830 A1 * | 5/2009 | Kato et al. | 429/160 |
| 2009/0186269 A1 * | 7/2009 | Kim et al. | 429/179 |
| 2009/0297939 A1 * | 12/2009 | Yoon | 429/160 |
| 2010/0104939 A1 * | 4/2010 | Wang et al. | 429/160 |
| 2010/0216008 A1 * | 8/2010 | Yoon | 429/158 |
| 2010/0216009 A1 * | 8/2010 | Kim | 429/160 |
| 2010/0227212 A1 * | 9/2010 | Kim | 429/158 |
| 2010/0233915 A1 * | 9/2010 | Kim | 439/754 |
| 2011/0081568 A1 * | 4/2011 | Kim et al. | 429/158 |
| 2011/0117420 A1 * | 5/2011 | Kim et al. | 429/158 |
| 2011/0135986 A1 * | 6/2011 | Qiu et al. | 429/120 |
| 2011/0177381 A1 * | 7/2011 | Oya et al. | 429/158 |
| 2011/0256445 A1 * | 10/2011 | Kim et al. | 429/158 |
| 2011/0287299 A1 * | 11/2011 | Kim | 429/158 |
| 2012/0009461 A1 * | 1/2012 | Kim et al. | 429/158 |
| 2012/0040226 A1 * | 2/2012 | Kim et al. | 429/120 |
| 2012/0129042 A1 * | 5/2012 | Kurahashi | 429/158 |

* cited by examiner

FIG. 1A
-- Prior Art --
FIG. 1B
-- Prior Art --
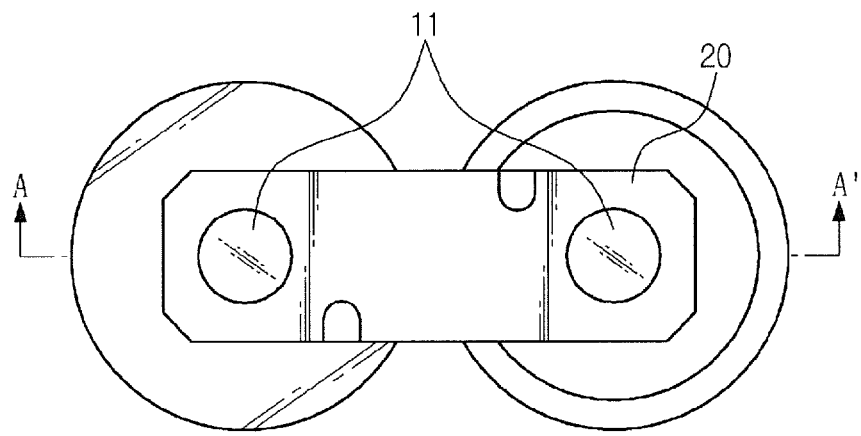
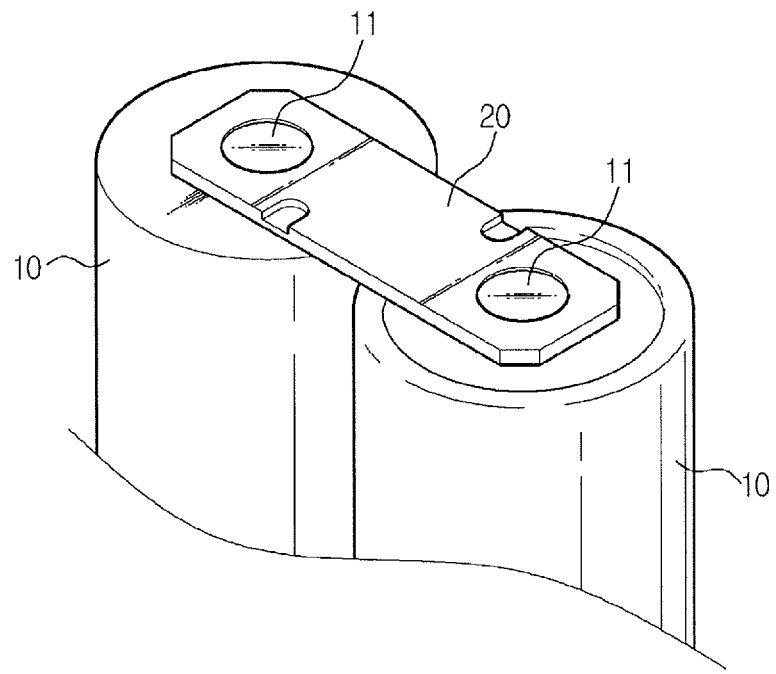

TERMINAL CONNECTING DEVICE FOR ENERGY STORAGE MODULE

CROSS-REFERENCE TO RELATED APPLICATION(S)

This application claims priority from Korean Patent Application No. 10-2011-0130421, filed on Dec. 7, 2011, the entire disclosure of which is incorporated herein by reference for all purposes.

BACKGROUND

1. Field

Exemplary embodiments relate to an energy storage device such as an ultracapacitor or battery, and more particularly, to a terminal connecting device for connecting a plurality of cells for a high voltage energy storage assembly.

2. Description of the Related Art

Generally, a representative example of an electrical energy storage device includes a battery and a capacitor.

Among capacitors, an ultracapacitor, also known as a supercapacitor, is an energy storage device having characteristics in between those of an electrolytic condenser and a secondary battery. Since an ultracapacitor has high efficiency and a semipermanent life span, the ultracapacitor is considered as a next-generation energy storage device that is useable in parallel with or in replace of a secondary battery.

To implement a high voltage battery using an ultracapacitor, a high voltage module of several hundred volts V is needed. The high voltage module is a high voltage ultracapacitor assembly in which a necessary number of ultracapacitors as unit cells are connected. In this instance, a busbar is used in connecting a plurality of ultracapacitors.

FIGS. 1A to 1C illustrate an energy storage module or assembly in which cell terminals are connected by an interference fit using a conventional busbar.

Conventionally, a plurality of cells 10 are connected using a busbar 20 to form a module or assembly with the busbar 20 interference-fitted into cell terminals 11 of the cells 10, as shown in FIGS. 1A to 1C.

In other words, the busbar 20 having holes corresponding to the cell terminals 11 is prepared and then placed such that the holes are aligned with the corresponding cell terminals 11. Next, the busbar 20 is forcedly inserted and press-fitted into the cell terminals 11.

However, this connection by an interference fit using the conventional busbar 20 has advantages such as being simple in configuration, inexpensive costs, and easy to assemble, but cannot guarantee the connection reliability when the tightness of fit decreases. That is, the vibration resistance or durability is low.

Moreover, when the fit becomes loose or the cell terminal 11 slips off, it will have a bad influence on a system using the module or assembly.

Also, to apply an interference fit, the precision of the busbar 20 and the cell terminals 11 to be fitted is very important. This is because it could lead to the possibility of fault occurrence increasing along with the difficulty in manufacturing the components.

FIGS. 2A to 2D illustrate an energy storage module or assembly in which cell terminals are connected with nuts using a conventional busbar.

As shown in FIGS. 2A to 2D, the busbar 20 is tightly coupled to the cell terminals 11 with nuts 30 that improve the coupling strength between the busbar 20 and the cell terminals 11.

In other words, the cell terminals 11 protrude from the top of the cells 10 and the busbar 20 has holes corresponding to the cell terminals 11. The busbar 20 is placed such that the holes are aligned with the corresponding cell terminals 11. Next, the busbar 20 is secured to the cell terminals 11 with the nuts 30.

This conventional connection using the nuts 30 improves the coupling strength or connection reliability, but increases the full size of the module or assembly due to the height and volume of the nuts 30 used.

Because of the problems above, this conventional connection does not go with the trend of equipments using an energy storage module or assembly toward minimization and light weight, and unnecessary height and volume has a bad influence on the design of the products. That is, the freedom of the design reduces and the design of the products is restricted.

SUMMARY OF THE INVENTION

The present invention is designed to solve the above problems, and therefore it is an object of the present invention to provide a terminal connecting device for an energy storage module that has improvements in the structure and a scheme for connecting a plurality of cells to be assembled to increase the coupling strength with cell terminals, thereby ensuring the connection durability and the connection reliability.

It is another object of the present invention to provide a terminal connecting device for an energy storage module that has improvements in the structure and a scheme for connecting a plurality of cells to be assembled to minimize the height and volume, thereby reducing the full size of the module or assembly.

Additional features of the invention will be set forth in the description which follows, and in part will be apparent from the description, or may be learned by practice of the invention.

To achieve the object of the present invention, provided is a terminal connecting device for an energy storage module to connect a plurality of cells for a high voltage capacitor or battery assembly, including a busbar having a body portion formed of a plate having a predetermined length stepped at both ends, and a cell terminal mounting portion having an insert hole at each end of the body portion into which a corresponding cell terminal is inserted, and a fastening member to secure the busbar by a screw connection with the cell terminal through the insert hole at each end of the body portion of the busbar, the fastening member having a nut body portion formed of a plate having a hollow at the center and the outer periphery processed in the shape of a nut, and a nut screw portion having a screw thread formed along the inner periphery of the hollow of the nut body portion for screw connection with the cell terminal, wherein the height of the step of the body portion of the busbar corresponds to the thickness of the nut body portion of the fastening member.

Preferably, the fastening member further includes a circular protrusion having a cylindrical shape protruding downward from the nut body portion along the hollow.

Preferably, the circular protrusion has an outer diameter corresponding to the diameter of the insert hole of the body portion of the busbar, or the circular protrusion has an outer diameter smaller than the diameter of the insert hole of the body portion of the busbar.

Preferably, the circular protrusion has a protruding length smaller than the thickness of the body portion of the busbar.

Preferably, the body portion of the busbar is stepped over the length including the cell terminal mounting portions at both ends thereof, and the body portion of the busbar is stepped at boundaries in the shape of a semicircle.

Preferably, the body portion of the busbar has a bent portion at the lower surface in the middle thereof to avoid the interference with a sleeve provided to provide insulation between the cells.

Preferably, the body portion of the busbar has a hole to receive a voltage measuring terminal of a balancing circuit for protecting the cells.

Preferably, the nut body portion is shaped of a standard nut corresponding to a standard fastening tool.

According to another aspect of the present invention, provided is a terminal connecting device for an energy storage module to connect a plurality of cells for a high voltage capacitor or battery assembly, including a busbar having a body portion formed of a plate with a predetermined length, and a cell terminal coupling portion having an insert hole at each end of the body portion into which a corresponding cell terminal is inserted, the insert hole at one end of the body portion having a screw thread along the inner periphery, and a fastening member formed of a circular plate having a hollow to secure the busbar by screw connection with the cell terminal through the insert hole at the other end of the body portion of the busbar.

BRIEF DESCRIPTION OF THE DRAWINGS

The accompanying drawing illustrates a preferred embodiment of the present disclosure and together with the foregoing closure, serves to provide further understanding of the technical spirit of the present disclosure. However, the present disclosure is not construed as being limited to the drawing.

FIGS. 1A to 1C are views illustrating an energy storage module or assembly in which cell terminals are connected by an interference fit using a conventional busbar.

DESCRIPTION OF THE PREFERRED EMBODIMENT

The present invention will now be described in detail with reference to the accompanying drawings. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible. Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

The present invention is characterized in that improvements are implemented in the structure of a busbar and a fastening member used in connecting cell terminals of a plurality of cells to assemble the cells such as ultracapacitors or batteries, thereby improving the coupling strength and stability, promoting the convenience of an assembly operation, and achieving the compact and light-weight connection. Also, a busbar can be simply and conveniently coupled to cell terminals only with a general standard nut without using a separate coupling tool or a fastening tool for a special purpose.

Figure 1C:
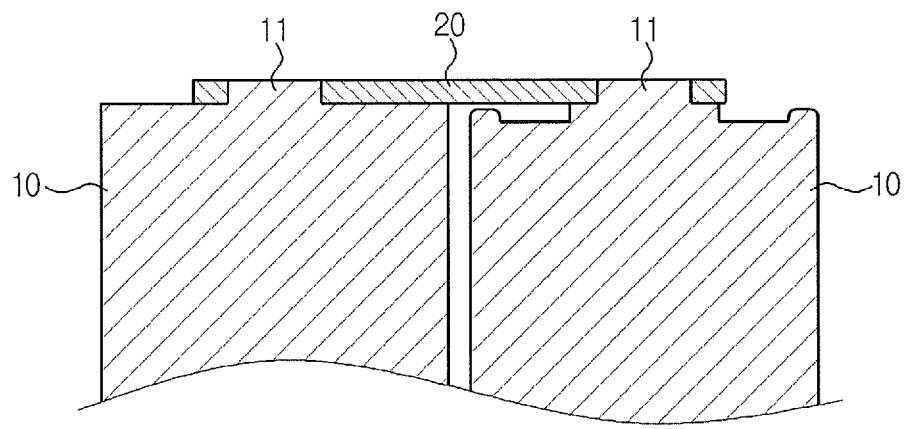
Figure 2A:
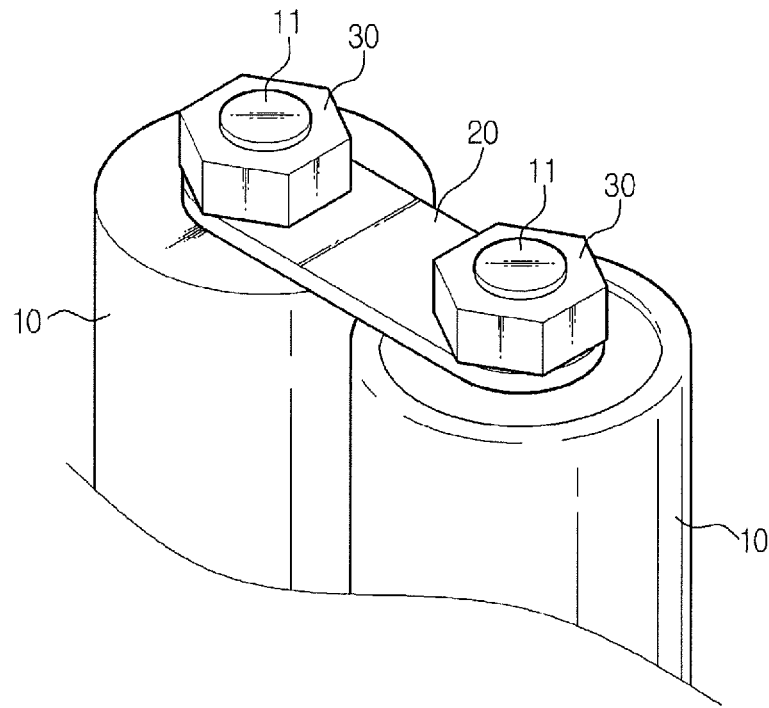
FIGS. 2A to 2D are views illustrating an energy storage module or assembly in which cell terminals are connected with nuts using a conventional busbar.
Figure 2B:
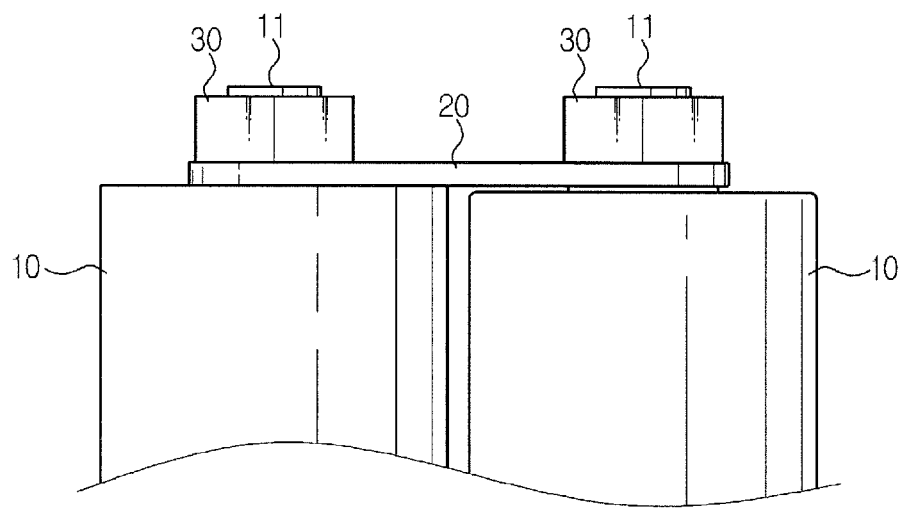
Figure 2C:
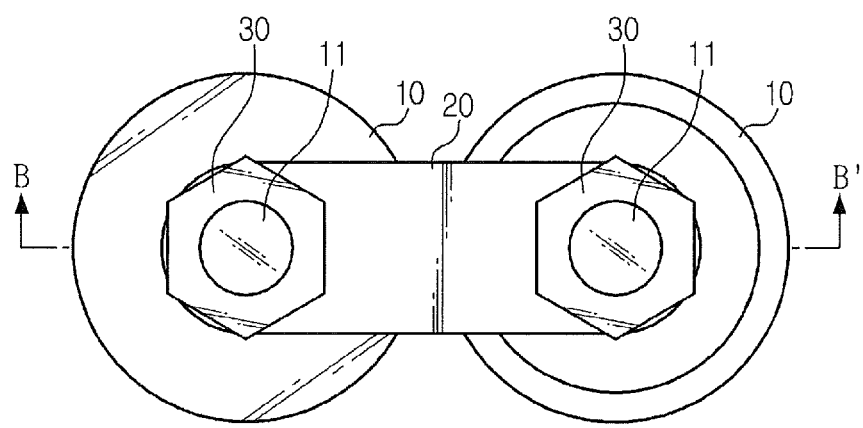
Figure 2D:
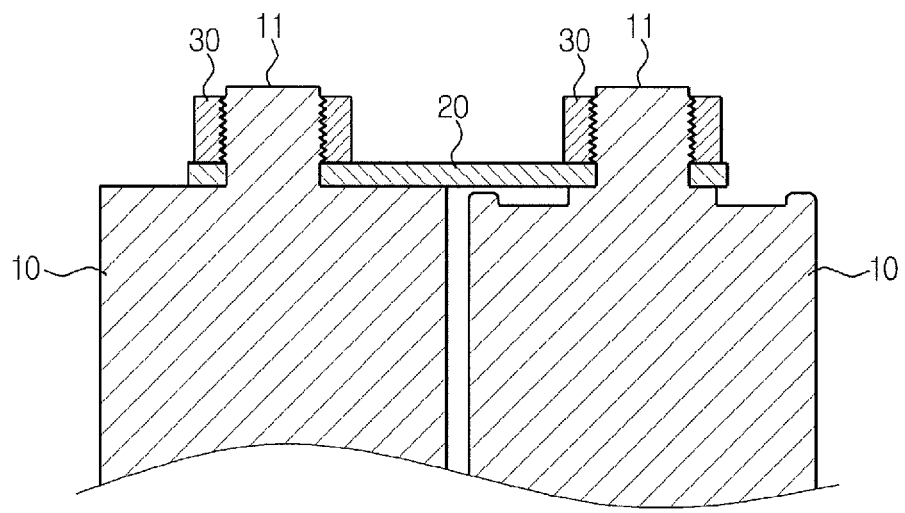
Figure 3:
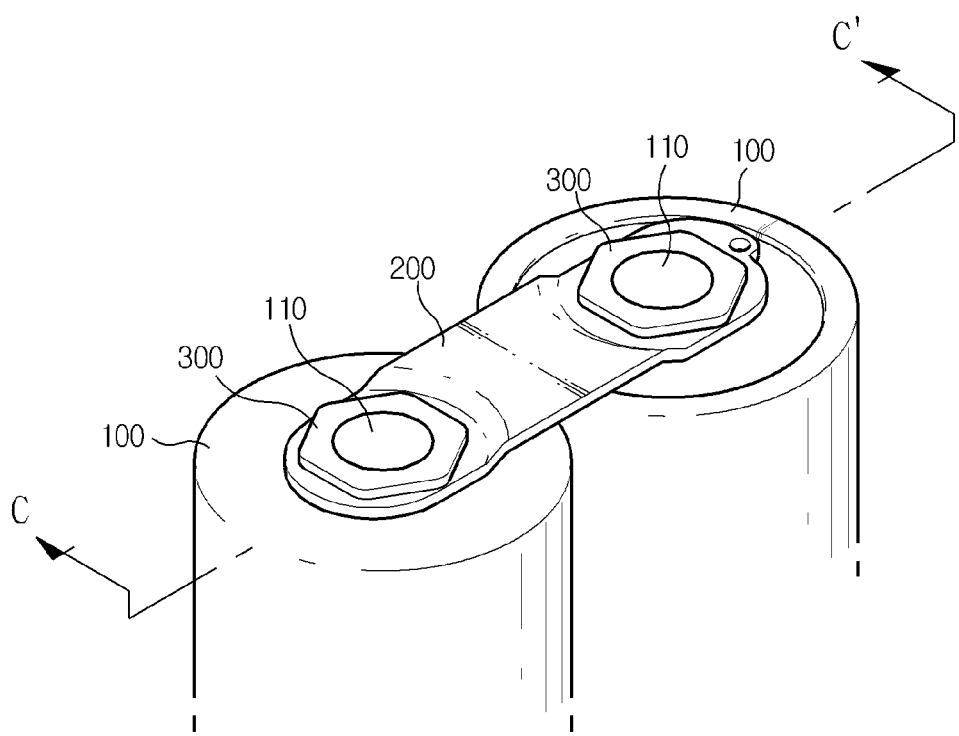
FIG. 3 is a perspective view illustrating the connection of cells by a terminal connecting device for an energy storage module according to an embodiment of the present invention.
Figure 4:
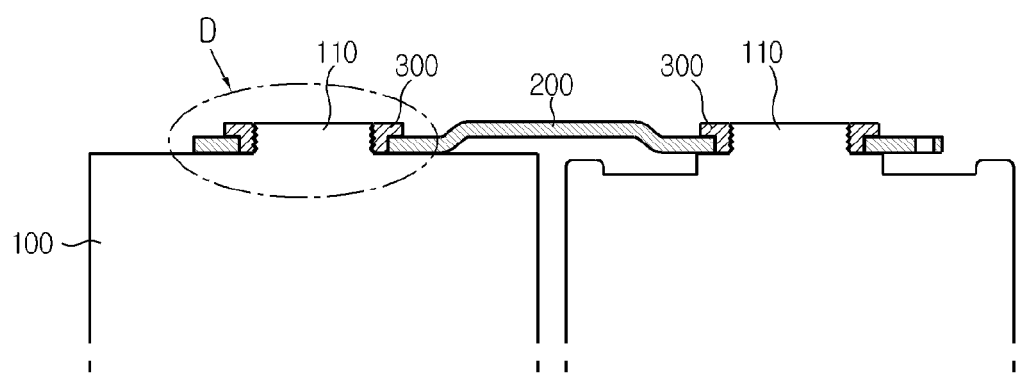
FIG. 4 is a cross-sectional view of FIG. 3, taken along the line C-C'.
Figure 5:
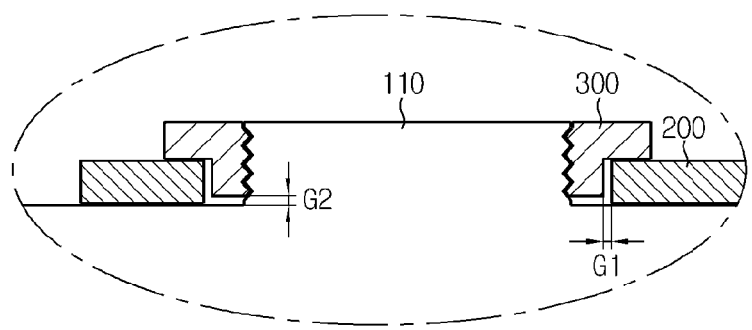
FIG. 5 is an enlarged cross-sectional view of the section D of FIG. 4.

FIG. 3 is a perspective view illustrating the connection of cells by a terminal connecting device for an energy storage module according to an embodiment of the present invention. FIG. 4 is a cross-sectional view of FIG. 3, taken along the line C-C'. FIG. 5 is an enlarged cross-sectional view of the section D of FIG. 4.

Referring to FIGS. 3 to 5, a terminal connecting device for an energy storage module according to the present invention includes a plurality of cells 100 storing energy, each having a cell terminal 110, a busbar 200, and a fastening member 300. The busbar 200 and the fastening member 300 are used in connecting the cell terminals 110 of the cells 100 to assemble the cells 100.

In other words, a high voltage energy storage assembly is formed by connecting a plurality of the cells 100 by the terminal connecting device of the present invention including the busbar 200 and the fastening member 300.

In this instance, the cell 100 is an individual cell where an electrical energy is stored, such as an ultracapacitor cell or battery cell. Typically, the cell 100 is cylindrical, and may take various forms, for example, a prismatic form or a plate-like form.

The cell terminal 110 of the cell 100 is for input/output of the stored electrical energy. The cell terminal 110 is typically located at the top or bottom of the cell 100 and has a cylindrical shape. Also, the cell terminal 110 is made from an electrical conductive material and connected to an electrode in the cell 100.

Particularly, the cell terminal 110 has a screw thread formed along the outer side or outer periphery thereof by tapping. The screw thread is for a screw connection with the fastening member 300 described below.

The busbar 200 mechanically and electrically connects a plurality of the cells 100 to form a module or assembly. The busbar 200 is coupled to the cell terminals 110 of a plurality of the cells 100 to mechanically and electrically connect a plurality of the cells 100. The busbar 200 has a body portion made of an electrically conductive material and cell terminal mounting portions formed at both ends to mount the cell terminals 110.

The cell terminal mounting portions of the busbar 200 have insert holes into which the cell terminals 110 are inserted. In the drawings, the busbar 200 has two insert holes to connect two cells 100. The insert holes are formed at both ends of the body portion of the busbar 200, and have a shape corresponding to that of the cell terminals 110 so that the cell terminals 110 are inserted into and mounted in the insert holes. Also, the insert holes have a diameter larger than an outer diameter of the cell terminals 110. This is to provide sufficient space or gap to prevent the insert holes of the busbar 200 from hindering a screw connection between the cell terminals 110 and the fastening member 300 described below.

The busbar 200 is formed of a thin plate with a predetermined length, and the plate is stepped at boundaries between the ends and the center of the body portion. Since the plate-shaped busbar 200 connects the cell terminals 110 cross the cells 100, the busbar 200 is preferably processed into a step structure such that the center of the body portion is posed higher than the ends of the body portion in direct contact with the cell terminals 110 to prevent the busbar 200 from contacting and interfering with the cells 100.

The fastening member 300 is formed of a thin plate-shaped nut, and has a hollow at the center and a screw thread formed along the inner periphery of the hollow. The fastening member 300 has a nut body portion in the shape of a nut, a nut screw portion having a screw thread formed along the inner periphery of the hollow, and a circular protrusion of a cylindrical shape protruding downward from the nut body portion along the hollow. After the cell terminals 110 are inserted and mounted in the insert holes of the busbar 200, the fastening member 300 is screw-connected with the cell terminals 110 to establish a mechanical and electrical connection between the cell terminals 110 and the busbar 200.

For this purpose, the nut body portion of the fastening member 300 has an outer diameter larger than the diameter of the insert holes of the cell terminal mounting portions of the busbar 200, or extends beyond the diameter of the insert holes. The circular protrusion of the fastening member 300 is screw-connected with the cell terminals 110 through the insert holes of the busbar 200 to increase the coupling strength between the busbar 200 and the cell terminals 110 and consequently improve the connection reliability. As shown in FIG. 5, an outer diameter of the circular protrusion of the fastening member 300 is smaller than the diameter of the insert holes of the cell terminal mounting portions of the busbar 200 to create a sufficient space or gap G1 between the fastening member 300 and the busbar 200 when the circular protrusion goes through the insert holes of the busbar 200 and is screw-connected with the cell terminals 110.

Although this embodiment shows the fastening member 300 having the circular protrusion for connection stability, the present invention is not limited in this regard. For example, the fastening member 300 may only have a nut body portion and a nut screw portion without a circular protrusion. In this case, the fastening performance of the fastening member 300 slightly decreases as a whole, but on the other hand, processing the fastening member 300 is easier and the manufacturing costs reduce.

The height of the nut body portion of the fastening member 300 is equal to the height of the step of the busbar 200. This is to make the height of the fastening member 300 equal to the height of the busbar 200 at the center after the cell terminals 110 are connected by the busbar 200 and the fastening member 300. Further, the cell terminals 110 are preferably designed to have a height equal to the height of the fastening member 300, that is, the height of the busbar 200.

Also, as shown in FIG. 5, the circular protrusion of the fastening member 300 has a limited length to provide a space or gap G2 between the fastening member 300 and the top or bottom of the cells 100 where the busbar 200 is supported, when the fastening member 300 fastens the busbar 200. For this purpose, the length of the circular protrusion of the fastening member 300 is smaller than the thickness of the plate of the busbar 200. This is so that when the fastening member 300 fastens to the busbar 200, a sufficient amount of pressure allows the busbar 200 to fasten to the fastening member 300 without directly contacting the top or bottom of the cells 100.

Hereinafter, the busbar 200 and the fastening member 300 are described in more detail with reference to FIGS. 6 and 7.

Figure 6:
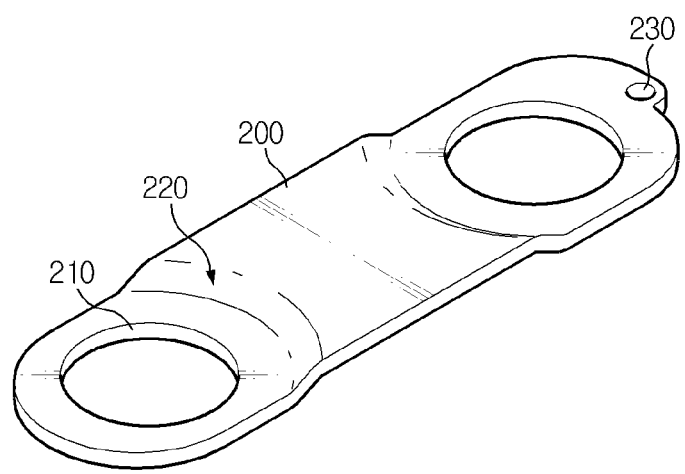
FIG. 6 is a view illustrating a busbar of a terminal connecting device for an energy storage module according to an embodiment of the present invention.
Figure 6:
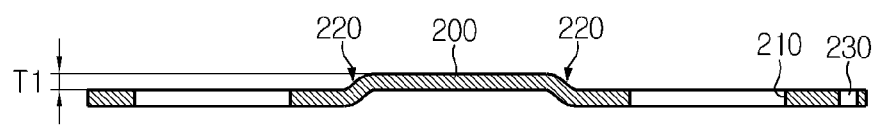

FIG. 6 is a view illustrating the busbar 200 of a terminal connecting device for an energy storage module according to an embodiment of the present invention. FIG. 7 is a view illustrating the fastening member 300 of a terminal connecting device for an energy storage module according to an embodiment of the present invention.

Figure 7:
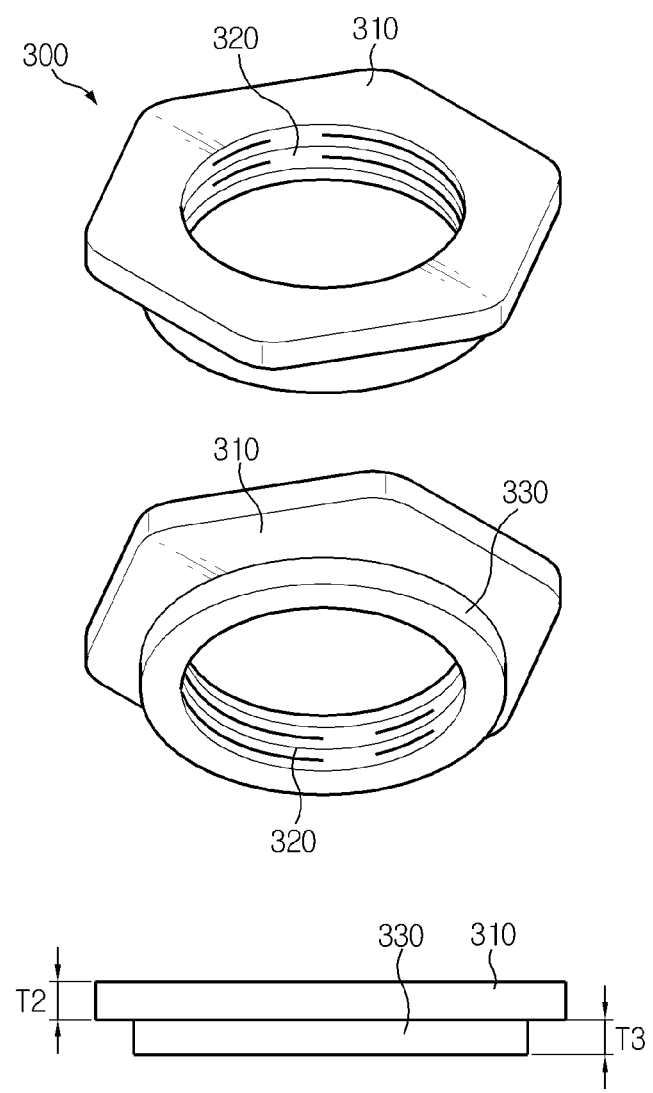
FIG. 7 is a view illustrating a fastening member of a terminal connecting device for an energy storage module according to an embodiment of the present invention.

Referring to FIGS. 6 and 7, the busbar 200 of the present invention has a body portion formed in the shape of a plate having a predetermined length, cell terminal mounting portions 210 formed at both ends of the body portion to mount the cell terminals 110, a circuit insert hole 230 formed at one end of the body portion to receive a terminal of a balancing circuit, and stepped portions 220 formed to make a difference in the height of the body portion between at both ends and at the center.

The body portion has a shape of a thin plate having a predetermined length and is made of an electrically conductive material. The length of the body portion is determined based on the interval of the cell terminals 110 of a plurality of the cells 100 at target to mechanically and electrically connect the cells 100. Also, the body portion is formed of a stepped plate in which the boundaries between the center and the ends of the body portion are bent. As shown in FIG. 6, the body portion protrudes at the center and sinks at both ends on the same level.

The protruding center of the body portion prevents the busbar 200 from interfering with a sleeve surrounding the side and the top/bottom of the cells 100 after assembly. The sinking ends of the body portion enable the busbar 200 to closely contact the cell terminals 110. The stepped plate of the body portion is formed using a press at a uniform thickness.

The stepped portions 220 are formed in the shape of a semicircle rather than a straight line. This is to secure the radii of rotation of the fastening member 300 and a fastening tool without interference during screw connection between the fastening member 300 and the cell terminals 110. Also, a straightly bent plate has higher mechanical strength such as bending or warpage resistance than a semicircularly bent plate.

Also, the stepped portions 220 have a height T1 of the step indicating how much the plate is bent, that is equal to a height T2 of the plate of the fastening member 300 described later. This is to maximize a contact area of a heat dissipation pad or a heat conducting tape to be attached after assembly by placing the busbar 200 flush with the fastening member 300.

The cell terminal mounting portions 210 are located at both ends of the body portion and have insert holes into which the cell terminals 110 are inserted and mounted. The cell terminals 110 are mounted in the insert holes of the cell terminal mounting portions 210 and then screw-connected with the fastening member 300 through the insert holes of the cell terminal mounting portions 210. Accordingly, the insert holes of the cell terminal mounting portions 210 have a shape corresponding to the outer side or outer periphery of the cell terminals 110.

The circuit insert hole 230 is formed at one end of the body portion by tapping. The circuit insert hole 230 receives a voltage measuring terminal of a balancing circuit that serves to protect the cells 100 in the energy storage module.

Referring to FIG. 7, the fastening member 300 of the present invention tightens the coupling of the busbar 200 to the cell terminals 110. The fastening member 300 has a nut body portion 310 formed of a thin plate-shaped nut having a hollow, a nut screw portion 320 having a screw thread formed along the inner periphery of the hollow of the nut body portion 310, and a circular protrusion 330 of a cylindrical shape protruding downward from the nut body portion 310 along the hollow.

The nut body portion 310 is formed of a thin plate having an outer periphery or a shape of a general or standard nut. As shown in FIG. 7, the nut body portion 310 is in a hexagonal nut shape having six sides. The present invention is not limited to a nut of a specific shape, and general or standard nuts of various shapes are obvious. The nut body portion 310 has a thickness T2 equal to the height T1 of the step of the body of the busbar 200.

The nut screw portion 320 has a screw thread formed along the inner periphery of the hollow of the nut body portion 310, and the screw thread extends to the inner periphery of the circular protrusion 330 described below. The nut screw portion 320 has a size and shape corresponding to the cell terminals 110 to be coupled.

The circular protrusion 330 takes a cylindrical form extending downward along the hollow of the nut body portion 310, and is in the shape of a circle with an inner periphery having the same screw thread as the nut screw portion 320 and an outer periphery smaller than the outer periphery of the nut body portion 310. The circular protrusion 330 has a height T3 smaller than the thickness T2 of the plate of the busbar 200. Also, the circular protrusion 330 has an outer diameter smaller than the inner diameter of the insert holes of the cell terminal mounting portions 210 of the busbar 200.

Figure 8:
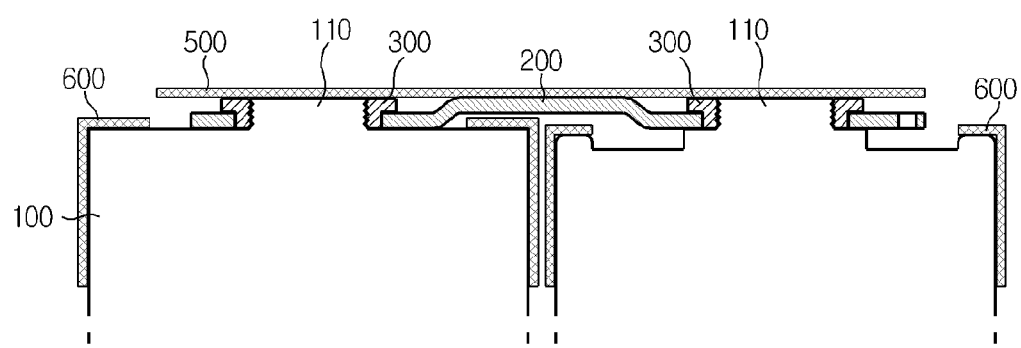
FIG. 8 is a cross-sectional view illustrating the connection of cells by a terminal connecting device for an energy storage module according to an embodiment of the present invention.

FIG. 8 is a cross-sectional view illustrating the connection of the cells 100 by a terminal connecting device for an energy storage module according to an embodiment of the present invention.

Referring to FIG. 8, the terminal connecting device of the present invention connects two cells 100. The cell terminals 110 of the cells 100 have screw threads. The cell terminals 110 are inserted into the insert holes of the cell terminal mounting portions 210 of the busbar 200 and then screw-connected with the fastening member 300 through the insert holes.

In this instance, the cell terminals 110 are electrically connected to the fastening member 300 through the screw connection, and since the fastening member 300 is supported by and contacted with the upper surface of the cell terminal mounting portion 210 of the busbar 200, the fastening member 300 is electrically connected to the busbar 200. Accordingly, a mechanical and electrical connection is established between the cell terminals 110 via the busbar 200 and the fastening member 300.

After the cells 100 are mechanically and electrically connected by the terminal connecting device according to the present invention, a heat dissipation member 500 such as a heat conductive tape is attached to the top of the busbar 200 to provide the heat dissipation performance. In this instance, since the height or thickness of the fastening member 300 posed at the sinking ends of the busbar 200 is equal to the height of the busbar 200, a plane surface containing a straight line as a whole is formed over the top of the busbar 200 and the fastening member 300. Accordingly, the heat dissipation member 500 can be easily attached to the plane surface over a wide area.

Also, after assembly, an insulation 600 such as a sleeve is attached to the surface of the cells 100 including the top of the cells 100 to provide insulation between the cells 100. The insulation 600 placed on the top of the cells 100 is received within the step of the busbar 200, thereby eliminating the interference.

FIGS. 9 to 12 are perspective views illustrating a process for connecting the cells 100 by a terminal connecting device for an energy storage module according to an embodiment of the present invention.

Hereinafter, a process for connecting the cells 100 by a terminal connecting device according to the present invention is described in more detail with reference to FIGS. 9 to 12.

Figure 9:
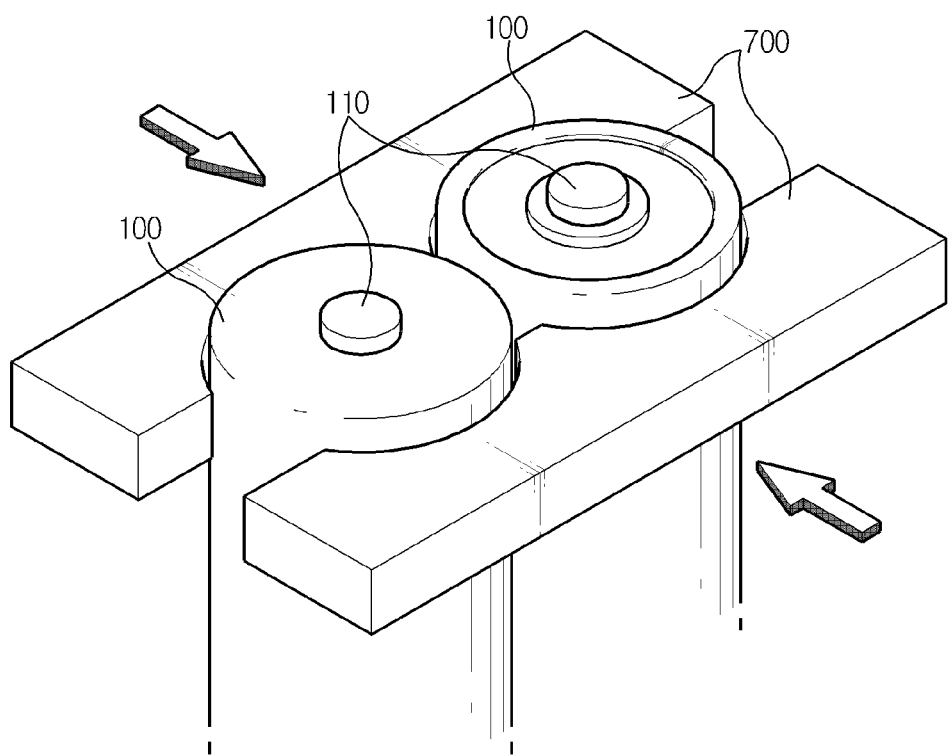
FIGS. 9 to 12 are perspective views illustrating a process for connecting cells by a terminal connecting device for an energy storage module according to an embodiment of the present invention.

First, as shown in FIG. 9, the cells 100 to be connected are fixed by a zig 700. In this instance, the cells 100 are prepared, and then arranged such that the heights of the cell terminals 110 are level with each other and compressed by the zig 700, so that the cells 100 are fixed in place.

Figure 10:
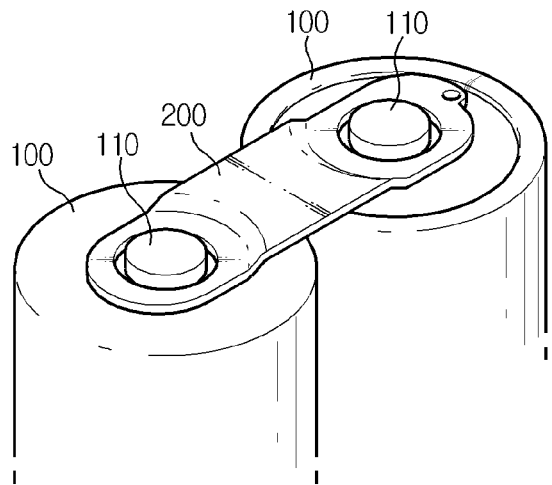

Next, as shown in FIG. 10, the busbar 200 is mounted on the fixed cells 100. In this instance, the busbar 200 is placed such that the insert holes of the busbar 200 are respectively aligned with the cell terminals 110 of the fixed cells 100, and then secured by inserting the cell terminals 110 into the insert holes of the busbar 200. In this instance, the burbar 200 may be fixed by a zig.

Figure 11:
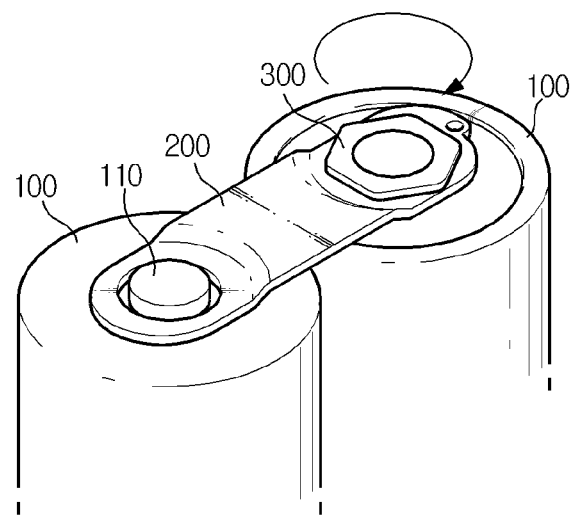

When the busbar 200 is mounted on the cell terminals 110, as shown in FIG. 11, the fastening member 300 is temporarily screw-connected with one of the cell terminals 110. In this instance, the temporary screw connection is made by hand or a general or standard tool.

Figure 12:
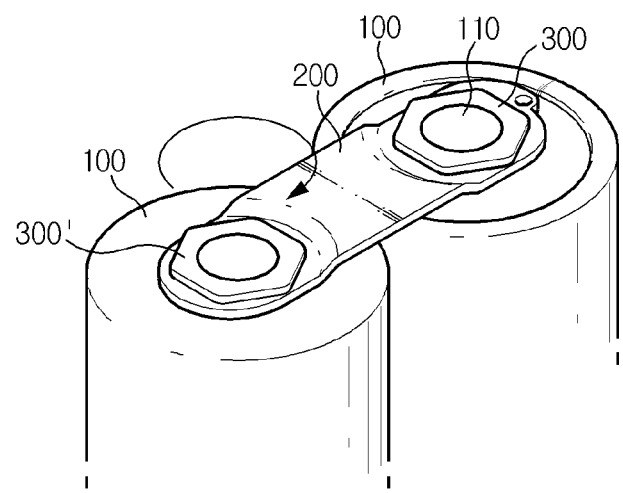

Next, as shown in FIG. 12, the other cell terminal 110 experiences the same operation using a fastening member 300' as the cell terminal 110 did. The cell terminals 110 are all temporarily screw-connected with the fastening member 300. By rotating the fastening member 300 with a desired torque using a general or standard fastening tool, the cell terminals 110 are completely connected. In this instance, the semicircular step structure of the busbar 200 can prevent the interference during rotation via torque.

Through the above process, the cell terminals are connected with a high coupling strength, thereby improving the connection reliability, and even after assembly, the overall height of the busbar is maintained less than a predetermined level, thereby achieving the compact and light-weight connection.

Figure 13A:
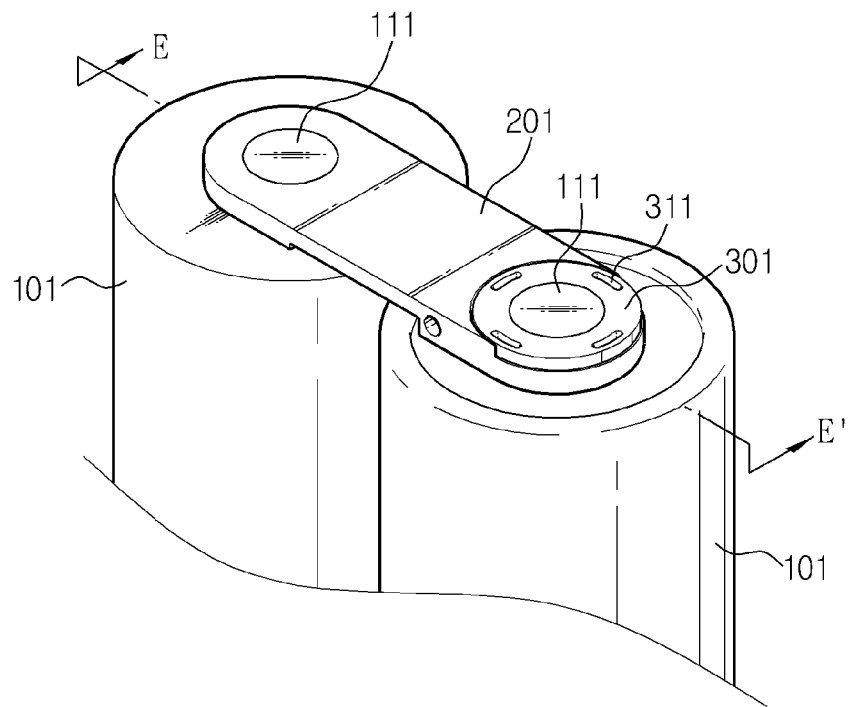
FIG. 13A is a perspective view illustrating the connection of cells by a terminal connecting device for an energy storage module according to another embodiment of the present invention.
Figure 13B:
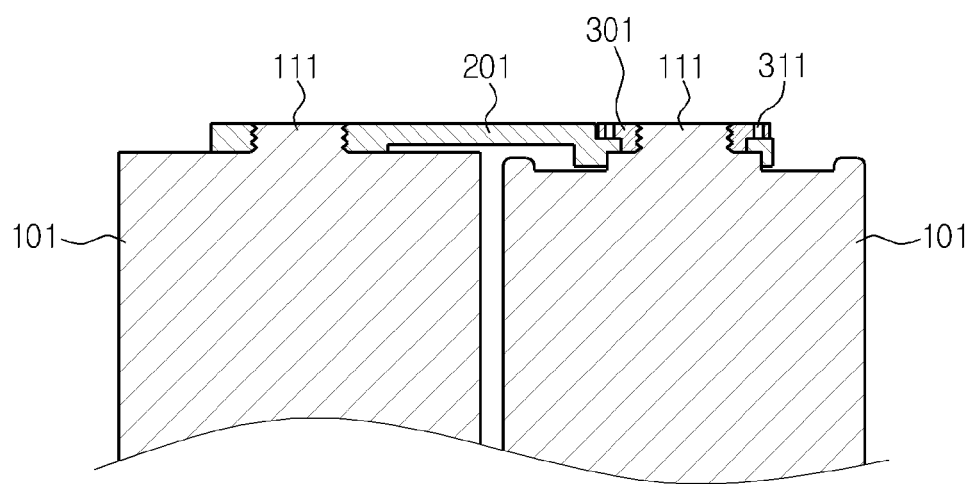
FIG. 13B is a cross-sectional view of FIG. 13A, taken along the line E-E'

FIG. 13A is a view illustrating the connection of cells 101 by a terminal connecting device for an energy storage module according to another embodiment of the present invention. FIG. 13B is a cross-sectional view of FIG. 13A, taken along the line E-E'.

The terminal connecting device for an energy storage module according to another embodiment of the present invention is characterized in that improvements are implemented in the structure of a busbar and a fastening member used in connecting a plurality of cells such as ultracapacitors or batteries to assemble the cells, thereby improving the coupling strength and stability, promoting the convenience of an assembly operation, and achieving the compact and light-weight connection.

Referring to FIGS. 13A and 13B, the terminal connecting device for an energy storage module according to another embodiment of the present invention includes a busbar 201 and a fastening member 301 to connect cell terminals 111 of a plurality of cells 101 to assemble the cells 101.

In other words, a high voltage energy storage assembly is formed by connecting a plurality of the cells 101 by the terminal connecting device of the present invention including the busbar 201 and the fastening member 301.

The cell 101 is an individual cell where an electrical energy is stored, such as an ultracapacitor cell or battery cell. Typically, the cell 101 is cylindrical, and may take various forms, for example, a prismatic form or a plate-like form.

The cell terminal 111 of the cell 101 is provided for input/output of the stored electrical energy. The cell terminal 111 is typically located at the top or bottom of the cell 101 and has a cylindrical shape. Also, the cell terminal 111 is made from an electrical conductive material and connected to an electrode in the cell 101.

Particularly, the cell terminal 111 has a screw thread formed along the outer side or outer periphery thereof by tapping. The screw thread is for a screw connection with the busbar 201 and the fastening member 301 described below.

The busbar 201 mechanically and electrically connects a plurality of the cells 101 to form a module or assembly. That is, the busbar 201 is coupled to the cell terminals 111 of a plurality of the cells 101 to mechanically and electrically connect a plurality of the cells 101. The busbar 201 has a body portion made of an electrically conductive material and cell terminal coupling portions where the cell terminals 111 are coupled.

The cell terminal coupling portions of the busbar 201 have insert holes into which the cell terminals 111 are inserted. In the drawings, the busbar 201 has two insert holes to connect two cells 101. The insert holes are formed at both ends of the body portion of the busbar 201, and one insert hole has a screw thread formed by tapping and the other does not have a screw thread. The busbar 201 is directly screw-connected with the cell terminal 111 through the insert hole at one end, and is not screw-connected with the cell terminal 111 at the other end and instead is coupled to the cell terminal 111 with the fastening member 301 described below.

The fastening member 301 is formed of a circular plate, and has a hollow at the center and a screw thread formed along the inner periphery of the hollow. After the first cell terminal 111 is directly screw-connected with the busbar 201 through the insert hole at one end of the busbar 201, the second cell terminal 111 is coupled to the busbar 201 with the fastening member 301 at the other end. Accordingly, the fastening member 301 has grooves 311 to receive a fastening tool used for a screw connection with the second cell terminal 111.

Hereinafter, the busbar 201 and the fastening member 301 are described in more detail with reference to FIG. 14.

Figure 14:
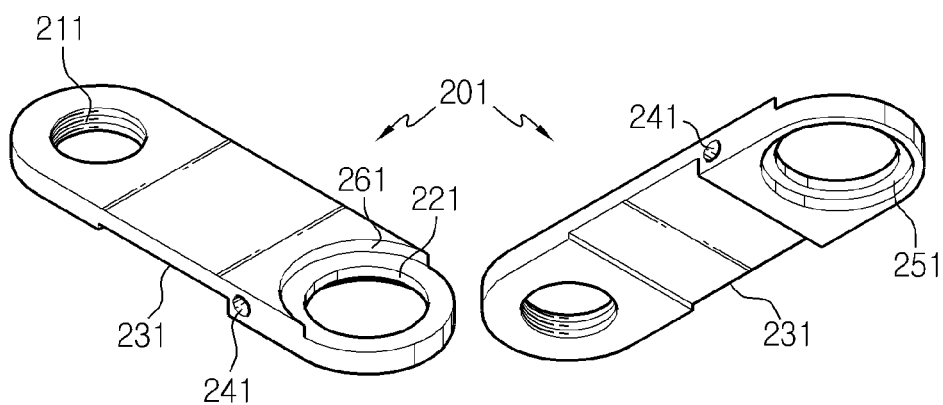
FIG. 14 is a perspective view illustrating a busbar of a terminal connecting device for an energy storage module according to another embodiment of the present invention.
Figure 15:
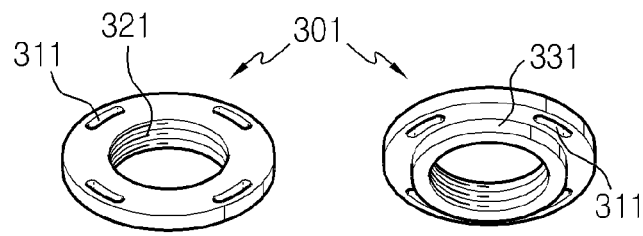
FIG. 15 is a perspective view illustrating a fastening member of a terminal connecting device for an energy storage module according to another embodiment of the present invention.

FIG. 14 is a perspective view illustrating the busbar 201 of a terminal connecting device for an energy storage module according to another embodiment of the present invention. FIG. 15 is a perspective view illustrating the fastening member 301 of a terminal connecting device for an energy storage module according to another embodiment of the present invention.

Referring to FIGS. 14 and 15, the busbar 201 of the present invention has a body portion formed of a plate with a predetermined length, cell terminal coupling portions 211 and 221 formed at both ends of the body portion to couple to the cell terminals 111, a step portion 231 formed at the lower surface in the middle of the body portion, a circuit insert hole 241 formed at one side of the body portion to receive a terminal of a balancing circuit, a stopper 251 formed at the cell terminal coupling portion 221 to stop further movement of the cell terminal 111 by contacting a cell terminal post of the cell terminal 111, and a dent portion 261 formed at the cell terminal coupling portion 221 to mount the fastening member 301 described later.

The body portion has a thin plate shape having a predetermined length and is made of an electrically conductive material. The length of the body portion is determined based on the interval of the cell terminals 111 of a plurality of the cells 101 to mechanically and electrically connect the cells 101.

The cell terminal coupling portions 211 and 221 are located at both ends of the body portion, and include the first insert hole 211 formed at one end of the body portion to couple to one cell terminal or a first cell terminal and the second insert hole 221 formed at the other end of the body portion to couple to the other cell terminal or a second cell terminal.

The first insert hole 211 has a screw thread for screw connection with the first cell terminal. The first cell terminal is screw-connected with the busbar 201 through the first insert hole 211 by the rotation of the body portion.

After the cell terminal is fixed in the first insert hole 211, it is difficult to rotate the body portion to couple to the other cell terminal. Accordingly, the second insert hole 221 is a plain hole free of a screw thread having a size sufficient to receive the cell terminal. The other cell terminal is coupled to the busbar 201 through the second insert hole 221 by the fastening member 301.

For this purpose, the second insert hole 221 has the stopper 251 and the dent portion 261.

The stopper 251 is formed at the bottom of the body portion around the second insert hole 221 and has a shape corresponding to a cell terminal post of the cell terminal. When the cell terminal is inserted into the second insert hole 221, the stopper 251 contacts the cell terminal post of the cell terminal to stop the cell terminal from moving further and guides the cell terminal locating at the second insert hole 221 in place.

The dent portion 261 sinks at the top of the body portion around the second insert hole 221. That is, the body portion has a relatively smaller thickness around the dent portion 261. This is to reduce the height of a structure protruding from the top of the body portion after the fastening member 301 is fitted.

The step portion 231 is formed at the lower surface in the middle of the body portion. This is to prevent the interference of the body portion with a separate structure provided at a contact area between the cells 100 connected to each other. Generally, a sleeve is provided at a contact area between the cells 100 to electrically isolate the cells 100. Since the sleeve extends to the top of the cells 100, the interference may occur between the sleeve and the busbar 201. For this reason, the body portion of the busbar 201 has the step portion 231 to receive the sleeve.

The circuit insert hole 241 is formed at one side of the body portion by tapping. The circuit insert hole 241 receives a voltage measuring terminal of a balancing circuit that serves to protect the cells 101 after assembly. The circuit insert hole 241 at one side of the body portion can avoid the interference when a heat conductive tape is attached to provide the heat dissipation performance.

The second insert hole 221 is where the cell terminal is coupled to the busbar 201 with the fastening member 301 of FIG. 15.

As shown in FIG. 15, the fastening member 301 is in the shape of a thin circular plate having a hollow, and has a screw thread 321 formed along the inner periphery of the hollow for a screw connection with the cell terminal, and grooves 311 formed along the outer periphery, into which a fastening tool is inserted.

The fastening member 301 is stepped such that an upper diameter is larger than a lower diameter. Accordingly, the fastening member 301 is screw-connected with the cell terminal and connected with the busbar 201 at the dent portion 261 of the body portion of the busbar 201. That is, the lower circular plate of the fastening member 301 having a smaller diameter goes through the second insert hole 221 of the busbar 201 and is screw-connected with the cell terminal, and the upper circular plate having a larger diameter cannot go through the second insert hole 221 and is placed on the dent portion 261.

Since the fastening member 301 of a thin circular plate is mounted in the dent portion 261, the fastening member 301 prevents a portion thereof from protruding from the top of the busbar 201. Also, the fastening member 301 has the grooves 311 for a fastening tool used in a fastening operation, thereby eliminating the need for a separate structure or protrusion.

Figure 16:
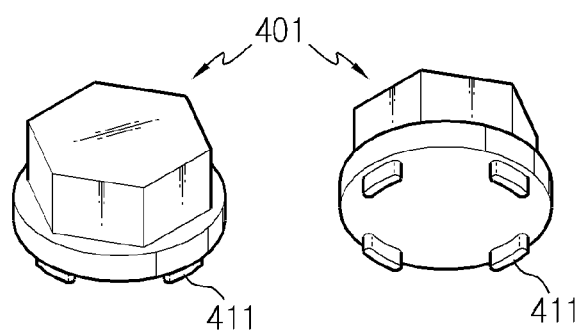
FIG. 16 is a perspective view illustrating a fastening tool of a terminal connecting device for an energy storage module according to another embodiment of the present invention.

FIG. 16 is a perspective view illustrating the fastening tool 401 used for a terminal connecting device for an energy storage module according to another embodiment of the present invention.

The fastening member 301 is screw-connected with the cell terminal by a rotation force applied to the fastening member 301 by the fastening tool 401. That is, inserts 411 of the fastening tool 401 are inserted into the grooves 311 of the fastening member 301, and in this state, the assembly tool 401 is rotated so that a rotation force is applied to the fastening member 301. In this instance, a polygon formed on the fastening tool 401 is rotated by a spanner to rotate the assembly tool 401.

Figure 17:
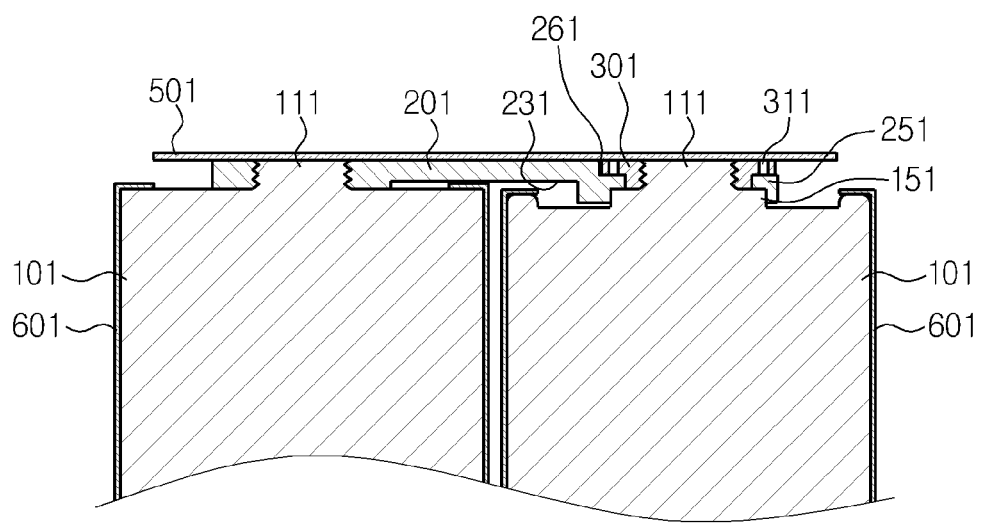
FIG. 17 is a cross-sectional view illustrating the connection of cells by a terminal connecting device for an energy storage module according to still another embodiment of the present invention.

FIG. 17 is a cross-sectional view illustrating the connection of the cells 101 by a terminal connecting device for an energy storage module according to still another embodiment of the present invention.

Referring to FIG. 17, the busbar 201 of the present invention connects two cells 101. The cell terminal 111 of the first cell 101 is directly screw-connected with the cell terminal coupling portion of the body portion of the busbar 201 having a screw thread. The cell terminal 111 of the second cell 101 is screw-connected with the fastening member 301 with the cell terminal coupling portion of the body portion of the busbar 201 interposed between the cell terminal 111 and the fastening member 301.

The upper surface of the circular plate of the fastening member 301 is contacted with the dent portion 261 around the second insert hole 221 of the body portion of the busbar 201 to establish an electrical connection therebetween. Also, a cell terminal post 151 around the cell terminal 111 of the cell 101 is engaged with the stopper 251 around the second insert hole 221 of the body portion of the busbar 201, so that the cell terminal 111 is maintained in place.

After the cells 101 are mechanically and electrically connected by the terminal connecting device according to the present invention, a heat dissipation member 501 such as a heat conductive tape is attached to the top of the busbar 201 to provide the heat dissipation performance. In this instance, the fastening member 301 is inserted into the dent portion 261 of the busbar 200, and as a result, a plane surface containing a straight line as a whole is formed over the top of the busbar 201 and the fastening member 301. Accordingly, the heat dissipation member 501 can be easily attached to the plane surface.

Also, to assemble the cells 101, an insulation 601 such as a sleeve is attached to the surface of the cells 101 to provide insulation between the cells 101. The insulation 601 placed on the top of the cells 101 is received within the step portion 231 of the busbar 201, thereby avoiding the interference.

Figure 18:
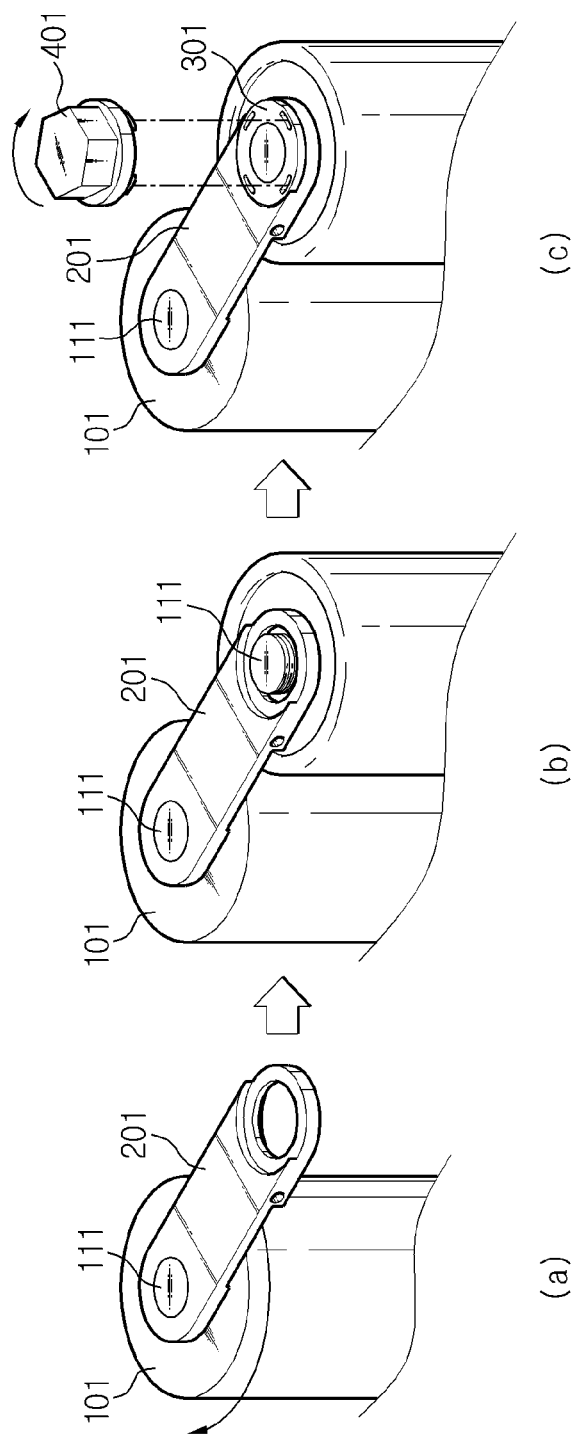
FIG. 18 is a view illustrating a process for connecting cells by a terminal connecting device for an energy storage module according to still another embodiment of the present invention.

FIG. 18 is a view illustrating a process for connecting the cells 101 to form an assembly by using a terminal connecting device for an energy storage module according to still another embodiment of the present invention.

As shown in (a) of FIG. 18, the first cell 101 is fixed by a zig and the like. Next, the busbar 201 of the present invention is prepared. The cell terminal 111 of the first cell 101 is inserted into the first insert hole of the busbar 201. The busbar 201 is rotated and screw-connected with the cell terminal 111.

As shown in (b) of FIG. 18, the cell terminal 111 of the second cell 101 is inserted into the second insert hole of the busbar 201. In this instance, the cell terminal post around the cell terminal 111 of the second cell 101 is aligned with the step portion around the second insert hole of the busbar 201, resulting in easy assembly.

As shown in (c) of FIG. 18, when the cell terminal 111 of the second cell 101 is inserted into the busbar 201, the fastening member 301 of the present invention is prepared and screw-connected with the cell terminal 111 above the busbar 201. In this instance, the fastening tool 401 is used in screw-connecting the fastening member 301 with the cell terminal 111. That is, after the fastening tool 401 is inserted into the grooves 311 of the fastening member 301, the fastening tool 401 is rotated and consequently the fastening member 301 is rotated. Thus, the fastening member 301 is screw-connected with the cell terminal 111.

Through the above process, the cell terminals are connected with a high coupling strength, thereby improving the connection reliability, and even after assembly, the overall height of the busbar is maintained less than a predetermined level, thereby achieving the compact and light-weight connection.

According to the foregoing, the terminal connecting device for an energy storage module has an improved structure including a busbar formed of a plate stepped at both ends and a plate-shaped nut having a thickness corresponding to the thickness of the step of the busbar, in which with cell terminals are aligned with insert holes at both ends of the busbar and coupled to the busbar with the plate-shaped nut, thereby maintaining high coupling or connection reliability even under vibration conditions or environmental changes after assembly.

Also, the thickness of the plate-shaped nut corresponds to the thickness of the step of the busbar, which does not have any influence on the overall height of the busbar even after assembly, thereby achieving a compact and light-weight connection and improving the freedom of design of products.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A terminal connecting device for an energy storage module to connect a plurality of cells for a high voltage capacitor or battery assembly, the device comprising:
    a busbar having a body portion formed of a plate having a predetermined length stepped at both ends, and a cell terminal mounting portion having an insert hole at each end of the body portion into which a corresponding cell terminal is inserted; and
    a fastening member to secure the busbar by a screw connection with the cell terminal through the insert hole at each end of the body portion of the busbar, the fastening member having a nut body portion formed of a plate having a hollow at the center and the outer periphery processed in the shape of a nut, and a nut screw portion having a screw thread formed along the inner periphery of the hollow of the nut body portion for screw connection with the cell terminal,
    wherein the height of the step of the body portion of the busbar is equal to the height of the nut body portion of the fastening member.

2. The terminal connecting device for an energy storage module according to claim 1,
    wherein the fastening member further includes a circular protrusion having a cylindrical shape protruding downward from the nut body portion along the hollow.

3. The terminal connecting device for an energy storage module according to claim 2,
    wherein the circular protrusion has an outer diameter corresponding to the diameter of the insert hole of the body portion of the busbar.

4. The terminal connecting device for an energy storage module according to claim 2,
    wherein the circular protrusion has an outer diameter smaller than the diameter of the insert hole of the body portion of the busbar.

5. The terminal connecting device for an energy storage module according to claim 2,
    wherein the circular protrusion has a protruding length smaller than the height of the body portion of the busbar.

6. The terminal connecting device for an energy storage module according to claim 1,
    wherein the body portion of the busbar is stepped over the length including the cell terminal mounting portions at both ends thereof.

7. The terminal connecting device for an energy storage module according to claim 6,
    wherein the body portion of the busbar is stepped at boundaries in the shape of a semicircle.

8. The terminal connecting device for an energy storage module according to claim 1,
    wherein the body portion of the busbar has a bent portion at the lower surface in the middle thereof to avoid the interference with a sleeve provided to provide insulation between the cells.

9. The terminal connecting device for an energy storage module according to claim 1,
    wherein the body portion of the busbar has a hole to receive a voltage measuring terminal of a balancing circuit for protecting the cells.

10. The terminal connecting device for an energy storage module according to claim 1,
    wherein the nut body portion is shaped of a standard nut corresponding to a standard fastening tool.

11. A terminal connecting device for an energy storage module to connect a plurality of cells for a high voltage capacitor or battery assembly, the device comprising:
    a busbar having a body portion formed of a plate with a predetermined length, and a cell terminal coupling portion having an insert hole at each end of the body portion into which a corresponding cell terminal is inserted, the insert hole at one end of the body portion having a screw thread along the inner periphery; and
    a fastening member formed of a circular plate having a hollow to secure the busbar by screw connection with the cell terminal through the insert hole at the other end of the body portion of the busbar.

12. The terminal connecting device for an energy storage module according to claim 11,
    wherein the body portion of the busbar is stepped such that the other end has a smaller thickness than one end.

13. The terminal connecting device for an energy storage module according to claim 11,
    wherein the body portion of the busbar has a stopper corresponding to a cell terminal post of the cell terminal at the other end.

14. The terminal connecting device for an energy storage module according to claim 11,
    wherein the body portion of the busbar has a step portion at the lower surface between one end and the other end to avoid the interference with a sleeve provided for insulation of the cells.

15. The terminal connecting device for an energy storage module according to claim 11,
    wherein the body portion of the busbar has a hole at the side to receive a voltage measuring terminal of a balancing circuit for protecting the cells.

16. The terminal connecting device for an energy storage module according to claim 11,
    wherein the fastening member is stepped such that portions have different diameters.

17. The terminal connecting device for an energy storage module according to claim 16,
    wherein the fastening member has a lower portion, where the cell terminal is coupled, having a smaller diameter than an upper portion.

18. The terminal connecting device for an energy storage module according to claim 11,
    wherein the fastening member has a screw thread along the inner periphery of the hollow to establish a screw connection with the cell terminal.

19. The terminal connecting device for an energy storage module according to claim 11,
    wherein the fastening member has a groove into a fastening tool is inserted.

* * * * *